United States Patent
Okayasu

(10) Patent No.: US 7,356,715 B2
(45) Date of Patent: Apr. 8, 2008

(54) DEVICE THAT PROVIDES POWER TO A HOST VIA A MINI-B INTERFACE UPON DETECTION OF A PREDETERMINED VOLTAGE

(75) Inventor: Kaoru Okayasu, Tokyo (JP)

(73) Assignee: TDK Corporation, Tokyo (JP)

( * ) Notice: Subject to any disclaimer, the term of this patent is extended or adjusted under 35 U.S.C. 154(b) by 365 days.

(21) Appl. No.: 10/878,373

(22) Filed: Jun. 29, 2004

(65) Prior Publication Data

US 2005/0039060 A1 Feb. 17, 2005

(30) Foreign Application Priority Data

Jun. 30, 2003 (JP) ............................. 2003-188861

(51) Int. Cl.
*G06F 1/00* (2006.01)

(52) U.S. Cl. ...................................... 713/300; 710/300

(58) Field of Classification Search .................... 710/1; 713/300

See application file for complete search history.

(56) References Cited

U.S. PATENT DOCUMENTS

| | | | |
|---|---|---|---|
| 6,292,858 B1 * | 9/2001 | Inkinen et al. ............... | 710/301 |
| 6,763,408 B1 * | 7/2004 | Sonoda ......................... | 710/73 |
| 6,963,933 B2 * | 11/2005 | Saito et al. ..................... | 710/1 |
| 2004/0004121 A1 * | 1/2004 | Nakamura et al. ........... | 235/441 |
| 2004/0246909 A1 * | 12/2004 | Ahn ............................. | 370/252 |
| 2005/0039060 A1 * | 2/2005 | Okayasu ....................... | 713/300 |

FOREIGN PATENT DOCUMENTS

| | | |
|---|---|---|
| JP | 3-127945 | 12/1991 |
| JP | 10-161783 | 6/1998 |
| JP | 11-249763 | 9/1999 |
| JP | 2001-142577 | 5/2001 |
| JP | 2002-55936 | 2/2002 |
| JP | 2002-202835 | 7/2002 |
| JP | 2002-237972 | 8/2002 |
| JP | 2004-094495 | 3/2004 |

OTHER PUBLICATIONS

"USB On-The-Go", http:www.usb.org/developers/onthego/.
http://www.kumikomi.net/article/explanation/2002/04usbgdv/01.html.

* cited by examiner

*Primary Examiner*—Thomas Lee
*Assistant Examiner*—Jaweed A Abbaszadeh
(74) *Attorney, Agent, or Firm*—Oblon, Spivak, McClelland, Maier & Neustadt, P.C.

(57) ABSTRACT

When a host 101 is connected to a device 102 via a USB cable 103, the ID terminal on the device 102 is short-circuited to the GND line, hence to reduce the voltage level of the ID terminal. Since power feeding means 109 starts feeding power to the $V_{BUS}$ terminal when detecting that the voltage level of the ID terminal turns from "H" to "L", the power is supplied to the host 101 through the $V_{BUS}$ line of the USB cable 103.

10 Claims, 8 Drawing Sheets

DEVICE THAT PROVIDES POWER TO A HOST VIA A MINI-B INTERFACE UPON DETECTION OF A PREDETERMINED VOLTAGE

BACKGROUND OF THE INVENTION

The present invention relates to a USB (Universal Serial BUS) interface system, and more particularly to a USB interface system and a device capable of supplying power from the device to a host.

USB is widely used as a general-purpose interface. USB is the standard standardized by the USB-IF (USB Implementers Forum) and it is a serial bus interface for connecting a host device such as a personal computer to a peripheral device such as a mouse and a keyboard. At present, USB is mounted in almost all the personal computers and they can be connected to any peripheral device if only having a USB terminal. USB includes two standards: USB 1.1 capable of transferring data in a low speed mode (1.5 Mbps) or in a full speed mode (12 Mbps) and USB 2.0 capable of transferring data at a high speed in a high speed mode (480 Mbps) in addition to the above-mentioned two modes. If USB 2.0 is employed, even a digital video can be connected to a computer.

A master-slave protocol is adopted in USB, and devices using the USB interface also have a master-servant relationship as a "host" and a "device". Usually, a personal computer works as a host and a peripheral works as a device, and even when the peripherals such as a digital camera and a printer communicate with each other, the communication is established through the personal computer that is the host. When feeding power, it is designed to supply the power from the host to the device necessarily.

Recently, with the spread of portable devices such as portable phones and PDAs, and with variation and high performance of peripherals, there arises a demand of connecting the peripherals with each other. As mentioned above, however, it is impossible to directly connect a peripheral with another peripheral through USB. When connecting the peripherals with each other, at least one of the peripherals has to be provided with a function of the host.

In order to connect the peripherals directly with each other without interposing a personal computer therebetween, USB-OTC (USB On-The-Go) is released as an additional standard of the USB 2.0 (refer to Non-Patent Articles 1 and 2). In the USB-OTG, a dual role device is prepared, in which a peripheral can work as a host as well as a device. When a peripheral wants to receive power but communicate information as a host, a dual role device could act as a device at first, then reverse the role with receiving the power. Thus, it could act as a host while keeping the above state of receiving power. As a result, power supply from a device to a host can be realized.

[Non-Patent Article 1]
USB Implementers Forum, "USB-On-The-Go", [online], [retrieval under the date of June 20, Hei-15], Internet<URL: http://www.usb.org/developers/onthego>

[Non-Patent Article 2]
David Duke, "Technical description: Additional standard "On-The-Go" for overcoming a problem of existing USB", [online], CQ Publishing Co., Ltd., 2001, [retrieval under the data of June 20, Hei-15], Internet<URL: http://www-.kumikomi.net/article/explanation/2002/04usbgdv/0.1html>

In order to work a unit as a dual role device, however, hardware and software for realizing the USB-OTG function is required, that is, it is necessary to mount a receptacle for exclusive use and install a predetermined protocol such as SRP (Session Request Protocol) and HNP (Host Negotiation Protocol). Accordingly, there is a problem of increasing the cost of the unit.

SUMMARY OF THE INVENTION

An object of the invention is to provide a USB interface system and a device capable of supplying power from the device to a host, like the above-mentioned dual role device, when it wants to receive power but communicate information as a host, without applying the USB-OTG to the above.

The above object of the invention is achieved by a USB interface system comprising a host and a device connected through a USB interface, the device including at least a Mini-B receptacle, a voltage supply which applies a predetermined voltage to an ID terminal of the Mini-B receptacle, and power supply which feeds a power to a $V_{BUS}$ terminal of the Mini-B receptacle when the voltage of the ID terminal is reduced to a predetermined level.

The invention is to provide a USB interface system and a device capable of supplying power from the device to a host without applying the USB-OTG to the above when it wants to receive power but communicate information as a host.

Preferably, the host includes at least a Mini-A receptacle and an ID terminal of the Mini-A receptacle is connected to a GND line.

Preferably, the USB interface system further comprises a USB cable for connecting the host and the device and an ID line of the USB cable is connected to a GND line.

Further, preferably, when the host and the device are connected via the USB cable, the ID terminal on the device is short-circuited to the GND line, hence to reduce the voltage, and detecting this state, the power feeding means within the device supplies power to the $V_{BUS}$ terminal. Therefore, power can be supplied from the device to the host.

Further, preferably, one end of the USB cable is directly fixed to the host.

Further, preferably, since it is not necessary to take trouble of connecting the USB cable to the host, the number of actions when connecting the host and the device can be decreased, thereby simplifying the connection work.

Further, preferably, the host includes at least a Mini-B plug and an ID terminal of the Mini-B plug is connected to a GND line.

Further, preferably, a connection can be easily established between the host and the device, instead of using a cable.

Further, preferably, the host is a wireless LAN adapter.

According to the invention, the wireless LAN adapter can be connected directly to another peripheral and the data within the peripheral can be directly transferred to a network to which peripheral are connected.

Furthermore, the above object of the invention is achieved also by a device to be connected to a host via a USB interface, which comprises a Mini-B receptacle, voltage applying means for applying a predetermined voltage to an ID terminal of the Mini-B receptacle, and power feeding means for feeding power to a $V_{BUS}$ terminal of the Mini-B receptacle when the voltage of the ID terminal is reduced to a predetermined level.

DETAILED DESCRIPTION OF THE PREFERRED EMBODIMENTS

Hereinafter, preferred embodiments of the invention will be described in detail referring to the accompanying drawings.

Figure 1:
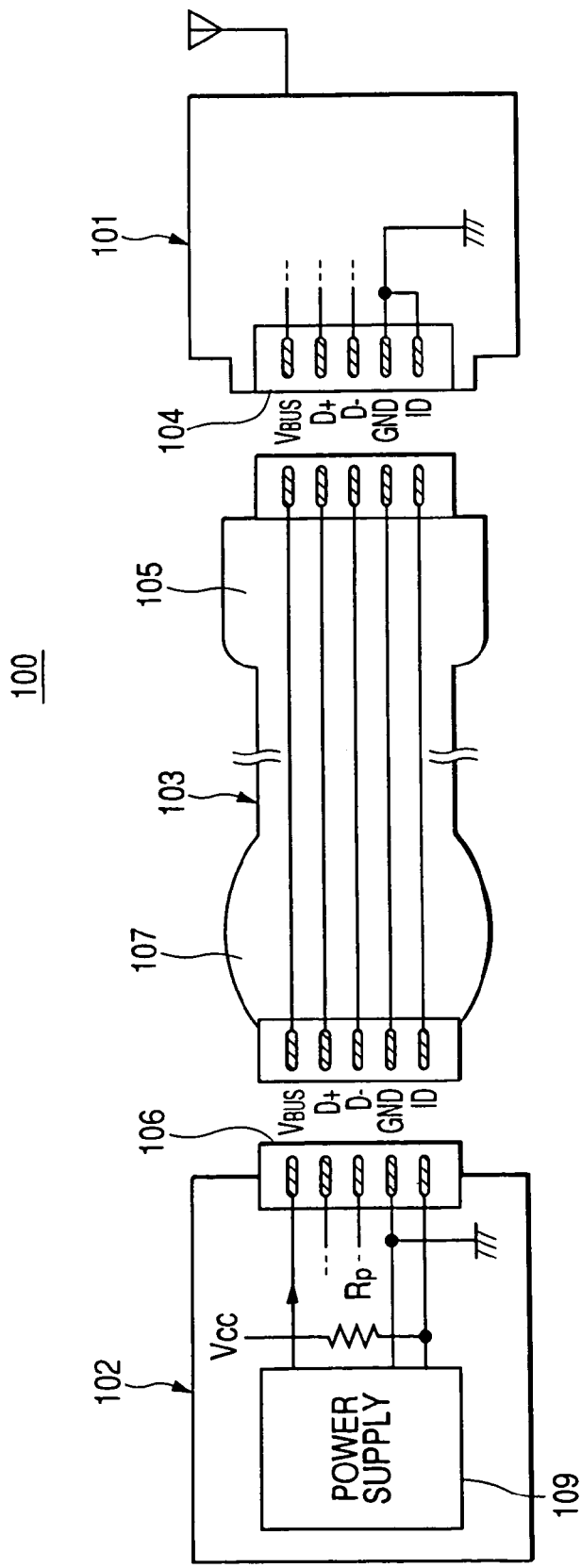
FIG. 1 is a schematic view showing the structure of the USB interface system according to a preferred embodiment of the invention.

FIG. 1 is a schematic view showing the structure of a USB interface system according to one preferred embodiment of the invention.

As illustrated in FIG. 1, this system comprises a peripheral 101 (hereinafter, referred to as a host) serving as a USB host, a unit 102 (hereinafter, referred to as a device) serving as a USB device, and a USB cable 103 for connecting them. In the invention, power supply is assumed from the device to the host, and the host 101 and the device 102 are the units having USB interfaces for the portable devices of low ability of power supply such as digital cameras, portable phones, and PDAs, and electric devices having AC power such as printers, faxes, scanners, and handy storages. Especially, this embodiment shows the case where the host is a "wireless LAN adapter" and the device is a "digital camera". By connecting the wireless LAN adapter directly to the digital camera, it is possible to transfer the image data within the digital camera directly to a network to which peripheral, e.g. a server, are connected.

According to the USB 2.0, USB includes a $V_{BUS}$ line that is the power line, a D+ line that is a data line on the side of plus, a D− line that is a data line on the side of minus, a ground (GND) line, and an ID line used for judging host/device in a dual role device. Power is supplied to one peripheral through the $V_{BUS}$ line. Serial transfer of the data on a pair of the data line consisting of the D+ line and the D− line realizes high speed data transfer.

The host 101, although it is not illustrated, is provided with a USB host controller for operating as a "USB host". According to a control of the host controller, the processing happening on the bus is all started from the host. The host is also provided with a Mini-A receptacle 104 that is a host exclusive connector. A Mini-A plug 105 of the USB cable 103 can be inserted into the Mini-A receptacle. A unit serving as a host is also referred to as "A device". Here, although a "host" generally requires a power supply function, the host according to this embodiment does not have the power supply function. Further, since a "host" generally means a unit working as a USB host, the "host" includes not only the unit working as a host but also a dual role device working as a host. In this embodiment, however, a host means only a unit working as a host, provided with the Mini-A receptacle and excludes the dual role device serving also as a device, provided with the Mini-AB receptacle.

The device 102, although it is not illustrated, is provided with a USB device controller for operating as a "USB device". Since data transfer is controlled by the host controller, the device never transmits the data when the host doesn't give a right to use a bus to the device even in the case of transmitting data from the device. The device 102 is also provided with a Mini-B receptacle 106 that is a connector for the exclusive use of device. A Mini-B plug 107 of the USB cable can be inserted into the Mini-B receptacle 106. A unit working as a device is also called as a "B device". The "device" in the embodiment does not require the power supply from the host.

The USB cable 103 is a directional cable, and as illustrated in the figure, it is provided with the Mini-A plug 105 in one end and the Mini-B plug 107 in the other end. Using a different shape of connector for each end of the cable prevents a misconnection such as connecting both USB hosts with each other and connecting both USB devices with each other. In this embodiment, the Mini-A plug 105 of the USB cable is inserted into the Mini-A receptacle 104 of the wireless LAN adapter and the Mini-B plug 107 is inserted into the Mini-B receptacle 106 of the digital camera, thereby connecting the both units via USB.

The conventional full size (standard) USB connector has four terminals, while a new connector (plug and receptacle) has five terminals. Namely, as mentioned above, it has the ID terminal in addition to the $V_{BUS}$ terminal, D+ terminal, D− terminal, and GND terminal. The ID terminal is generally to be used to distinguish whether it is the Mini-A plug or the Mini-B plug when a plug is inserted into the dual role device having the Mini-AB receptacle. In the ordinal USB-OTG compliant USB cable, since the ID terminal of the Mini-A plug is short-circuited to the GND line and the ID terminal of the Mini-B plug is opened, it is possible to judge which of the Mini-A plug and Mini-B plug is connected to the device by measuring the voltage level of the ID terminal.

While, differently from the usual USB cable, the ID terminals of the Mini-A plug 105 and the Mini-B plug 107 are straightly connected in the USB cable 103 according to the embodiment. Further, the ID terminal of the Mini-A receptacle 104 on the host is connected to the GND line. Therefore, when the host 101 and the device 102 are connected via the USB cable 103, the ID terminal of the device 102 is to be connected to the GND line.

Further, a predetermined voltage is applied there by pulling up the ID terminal on the device 102. In other words, the ID terminal is connected to a voltage source Vcc through a pull-up resistor $R_p$ and kept at a predetermined voltage level ("H" level). The device 102 also has power feeding means 109 for feeding power to the $V_{BUS}$ terminal. The power feeding means 109 includes a supply circuit and switching means although the detail thereof will be described later. The power feeding means 109 monitors the voltage level of the ID terminal and when detecting that it is reduced to a predetermined level ("L" level), the power feeding means 109 starts feeding.

In the system constituted in the above, when the host 101 is connected to the device 102 via the USB cable 103, the ID terminal on the device 102 is short-circuited to the GND line and the voltage level of the ID terminal is reduced. When the power feeding means 109 detects that the voltage level of the ID terminal turns from "H" to "L", it starts feeding power to the $V_{BUS}$ terminal and the power is supplied to the host 101 via the $V_{BUS}$ line of the USB cable 103.

Figure 2:
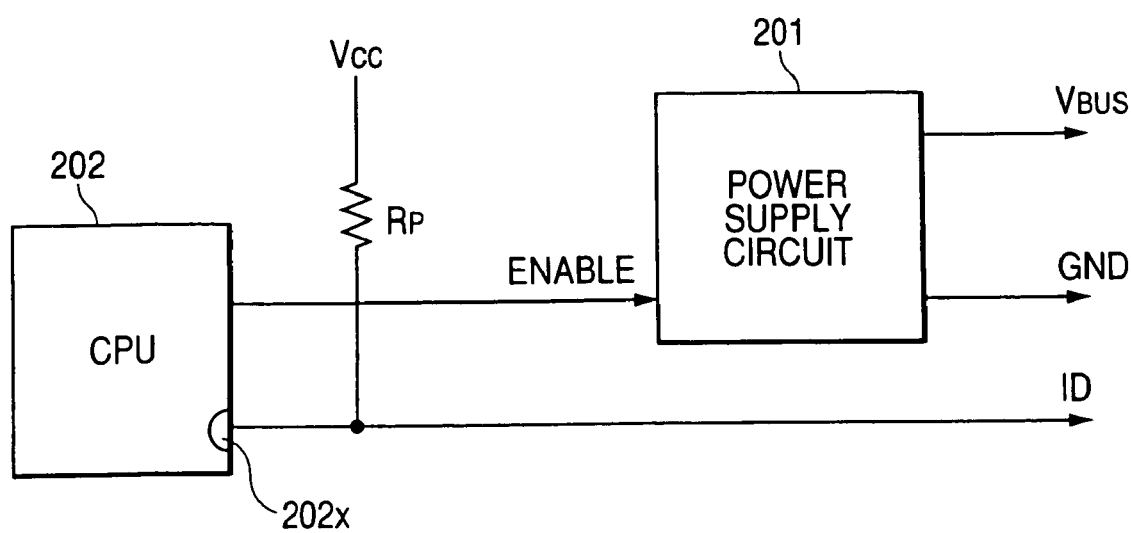
FIG. 2 is a schematic block diagram showing the structure of the power feeding means 109A that is one example of the above power feeding means 109.

FIG. 2 is a schematic block diagram showing the structure of power feeding means 109A that is one example of the above power feeding means 109.

As illustrated in FIG. 2, the power feeding means 109A includes a power supply circuit 201 and a CPU 202. The power supply circuit 201 has a function of feeding power to the $V_{BUS}$ terminal as well as an enable function. While, the CPU 202 has an interruption input terminal 202x and by connecting the ID terminal to this terminal 202x, the operation of the supply circuit 201 is controlled according to a change in the state of the ID terminal. This control is fundamentally realized by software.

When the ID terminal is connected to the GND line by establishing a connection between the host and the device, the CPU 202 detects an increase of the voltage in the ID terminal. Since the power supply circuit 201 is turned on according to an enable signal from the CPU 202, the power supply circuit 201 supplies a predetermined power to the $V_{BUS}$.

In this embodiment, although the case where the CPU 202 has the interruption input terminal 202x has been described, the CPU may be provided with a GPIO (General Purpose Input Output) terminal or an input terminal having only the input function of the above. By connecting the ID terminal to this terminal, the state of the ID terminal is polled by the CPU and the operation of the supply circuit 201 is controlled. This polling control is realized by software. In the above-mentioned interruption control, since the hardware itself of the CPU automatically monitors the state of the terminal, it is not necessary to monitor the ID terminal regularly by software, but in the polling control, it is necessary to monitor the state of the terminal regularly by software.

Figure 3A:
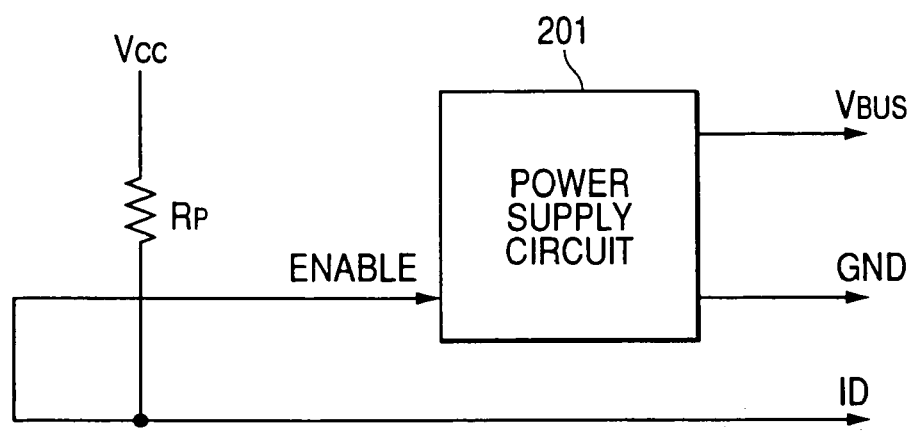
FIGS. 3A and 3B are schematic block diagrams showing the structures of the power feeding means 109B and 109C that are the other examples of the power feeding means 109.
Figure 3B:
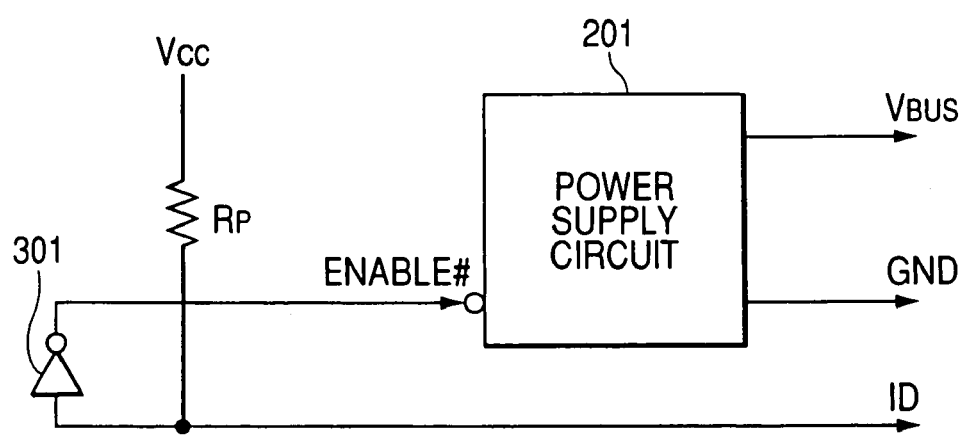

FIGS. 3A and 3B are schematic views showing the structures of power feeding means 109B and 109C respectively that are the other examples of the power feeding means 109.

As illustrated in FIG. 3A, this power feeding means 109B includes the power supply circuit 201 having an enable function of active LOW. The enable terminal of the power supply circuit is directly connected to the ID terminal, and the power supply circuit 201 is turned on and off according to a variation of the voltage of the ID terminal. While, as illustrated in FIG. 3B, when the power supply circuit 201 has the enable function of active HIGH, a NOT circuit 301 is interposed between the enable terminal and the ID terminal. Thus, the power supply circuit is turned on and off similarly to the case of FIG. 3A.

Figure 4:
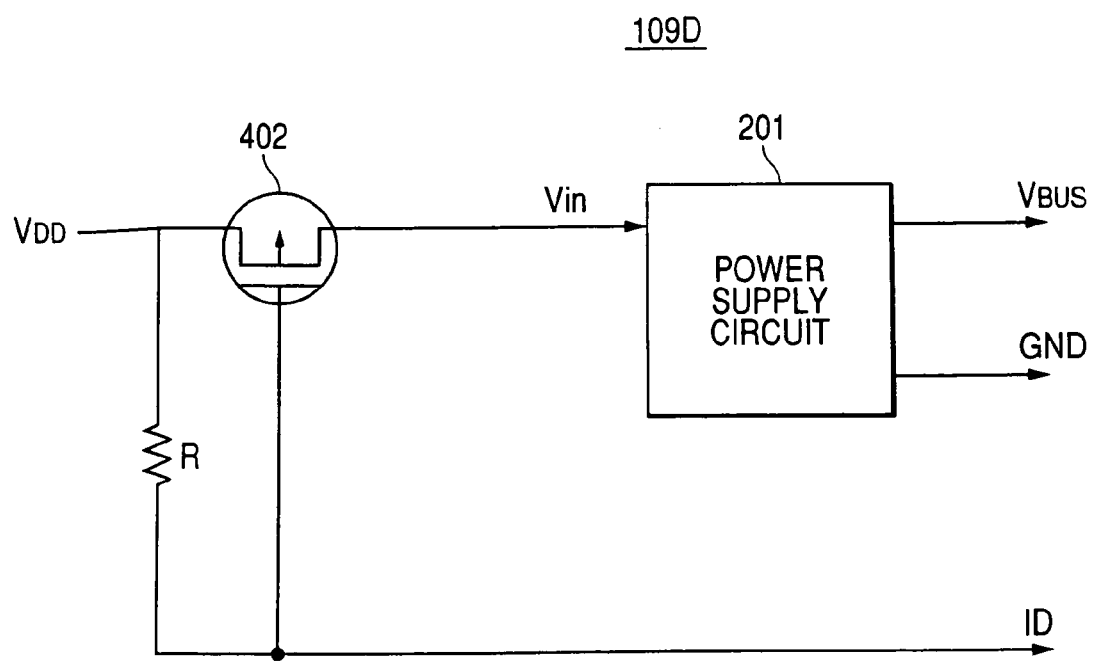
FIG. 4 is a schematic block diagram showing the structure of the power feeding means 109D that is further another example of the power feeding means 109.

FIG. 4 is a schematic block diagram showing the structure of power feeding means 109D that is further another example of the power feeding means 109.

As illustrated in FIG. 4, this power feeding means 109D includes the power supply circuit 201 as well as a switching circuit formed by P channel FET 402 and a resistor R. The resistor R is connected between source terminal and gate terminal of the FET 402. The gate terminal of the EFT 402 is connected to the ID terminal and the drain terminal is connected to the input power source line of the power supply circuit 201. A voltage is applied to the source terminal from the voltage source VDD. The ID terminal is pulled up by the resistor R.

When the ID terminal is opened, no current flows in the resistor R, no potential difference occurs between the source and the gate, and the FET 402 is turned off. Accordingly, a voltage from the voltage source VDD is never supplied to the input power source line of the power supply circuit 201. When the ID terminal is connected to the GND line by establishing a connection between the host and the device, current flows in the resistor R and potential difference occurs between the source and the gate. Therefore, the FET 402 is turned on and the voltage from the voltage source VDD is supplied to the input power source line of the power supply circuit 201. Therefore, a predetermined power is supplied from the power supply circuit 201 to $V_{BUS}$.

Figure 5:
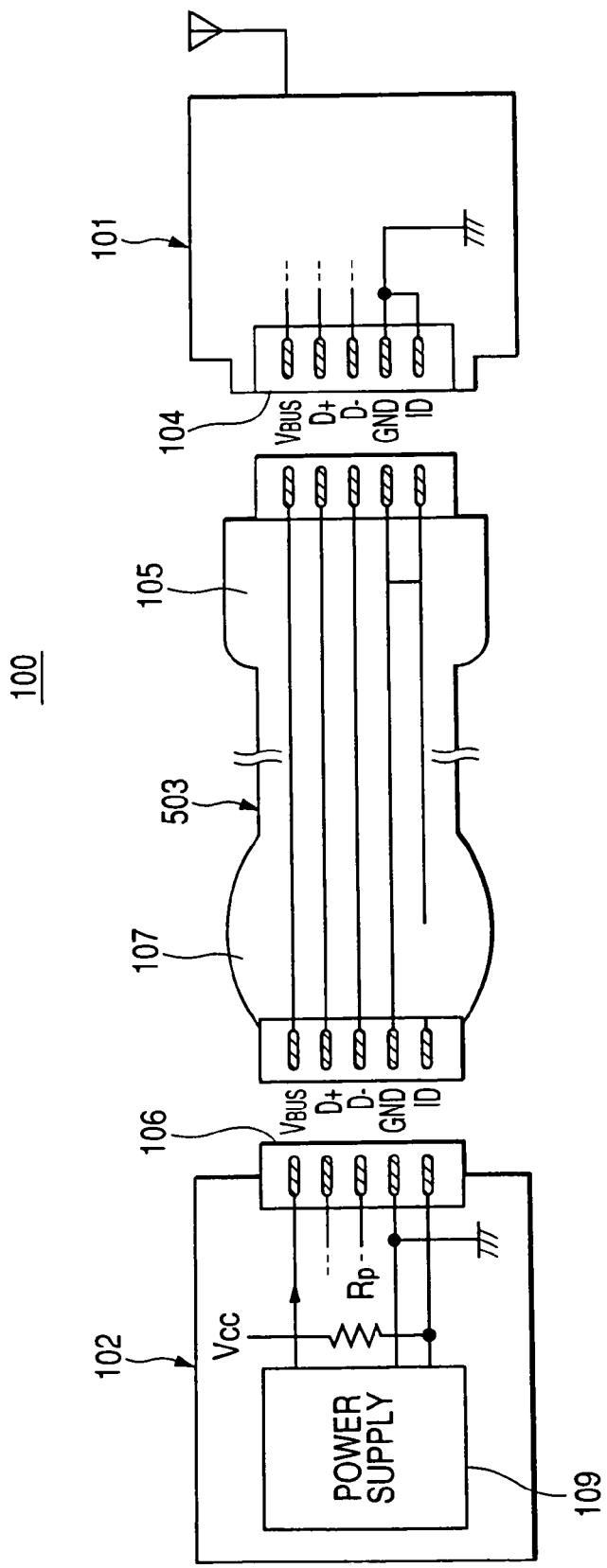
FIG. 5 is a schematic view for use in describing the case of using the ordinal USB cable, instead of the USB cable shown in FIG. 1.

FIG. 5 is a schematic view for use in describing the case of using the ordinary USB cable, instead of the USB cable 103 shown in FIG. 1.

As illustrated in FIG. 5, in an ordinary USB cable 503, the ID terminal of the Mini-A plug 105 is short-circuited to the GND line and the ID terminal of the Mini-B plug 107 is opened. Even when this USB cable 503 is connected to the device 102, since the voltage level of the ID terminal of the device 102 is not decreased, the power feeding means 109 never starts feeding power.

As mentioned above, according to this embodiment, when the host 101 is connected to the device 102 via the USB cable 103, the pulled-up ID terminal on the device 102 is short-circuited to the GND line and the voltage is reduced, and the power feeding means 109 within the device 102, detecting this state, supplies the power to the $V_{Bus}$ terminal, and therefore, the power can be supplied from the device 102 to the host 101. Namely, since the power can be supplied from the device to the host even when the peripheral is not formed as a dual role device, it is not necessary to install an OTG-compatible controller and software, thereby decreasing the cost of the system.

Figure 6:
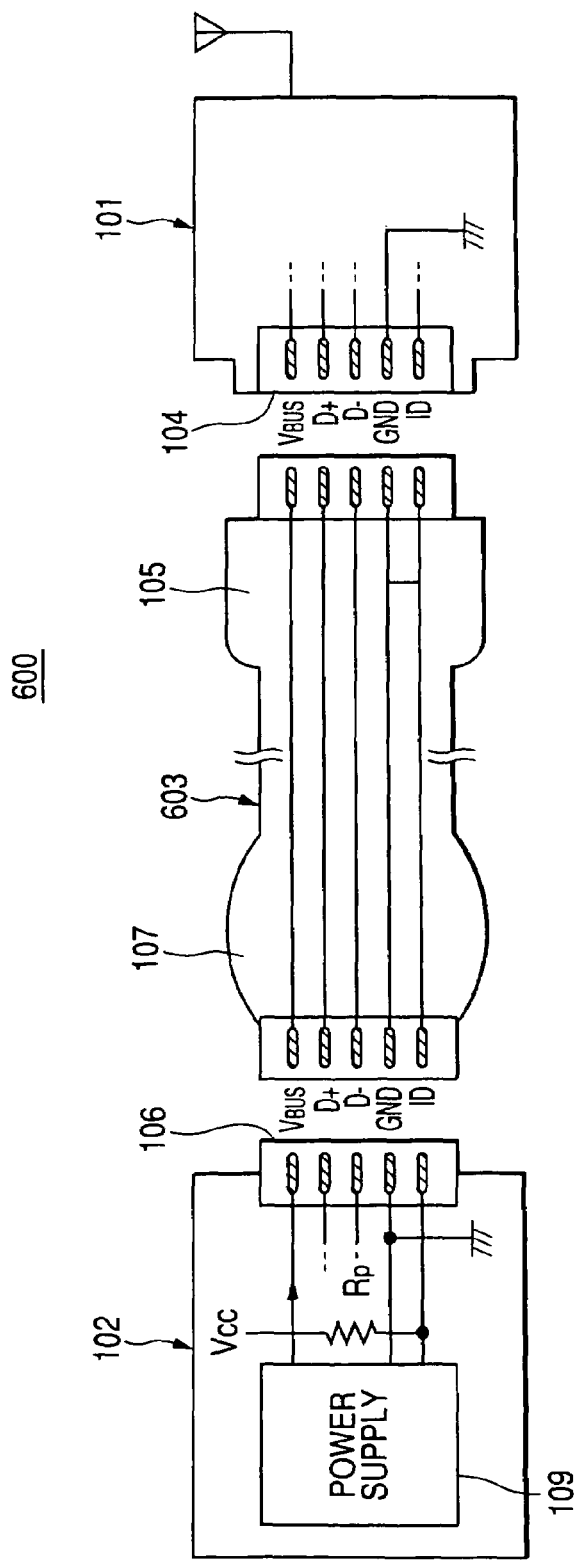
FIG. 6 is a schematic view showing the structure of the USB interface system according to another preferred embodiment of the invention.

FIG. 6 is a schematic view showing the structure of a USB interface system according to another preferred embodiment of the invention.

As illustrated in FIG. 6, in this system 600, the ID line is short-circuited to the GND line within the USB cable 603 not within the host 101. The other structure is substantially the same as that of the USB interface system shown in FIG. 1. Therefore, similarly to the system shown in FIG. 1, when this USB cable 603 connects the host 101 to the device 102, the ID terminal on the device 102 is short-circuited to the GND line and the voltage level of the ID terminal is reduced. Since the power feeding means 109 starts feeding power to the $V_{BUS}$ terminal when detecting the voltage level turns from "H" to "L", the power is supplied to the host 101 via the $V_{BUS}$ line of the USB cable 603.

As mentioned above, according to the embodiment, when the USB cable 603 connects the host 101 to the device 102, the pulled-up ID terminal on the device 102 is short-circuited to the GND line, hence to reduce the voltage, and the power feeding means 109 within the device 102, detecting this state, supplies the power to the $V_{BUS}$ terminal. Therefore, the power can be supplied from the device 102 to the host 101. Namely, it is not necessary to form a peripheral as a dual role device, in order to supply power from the device to the host, and therefore, it is not necessary to install the OTG-compatible controller or software, thereby reducing the cost of the system.

Figure 7:
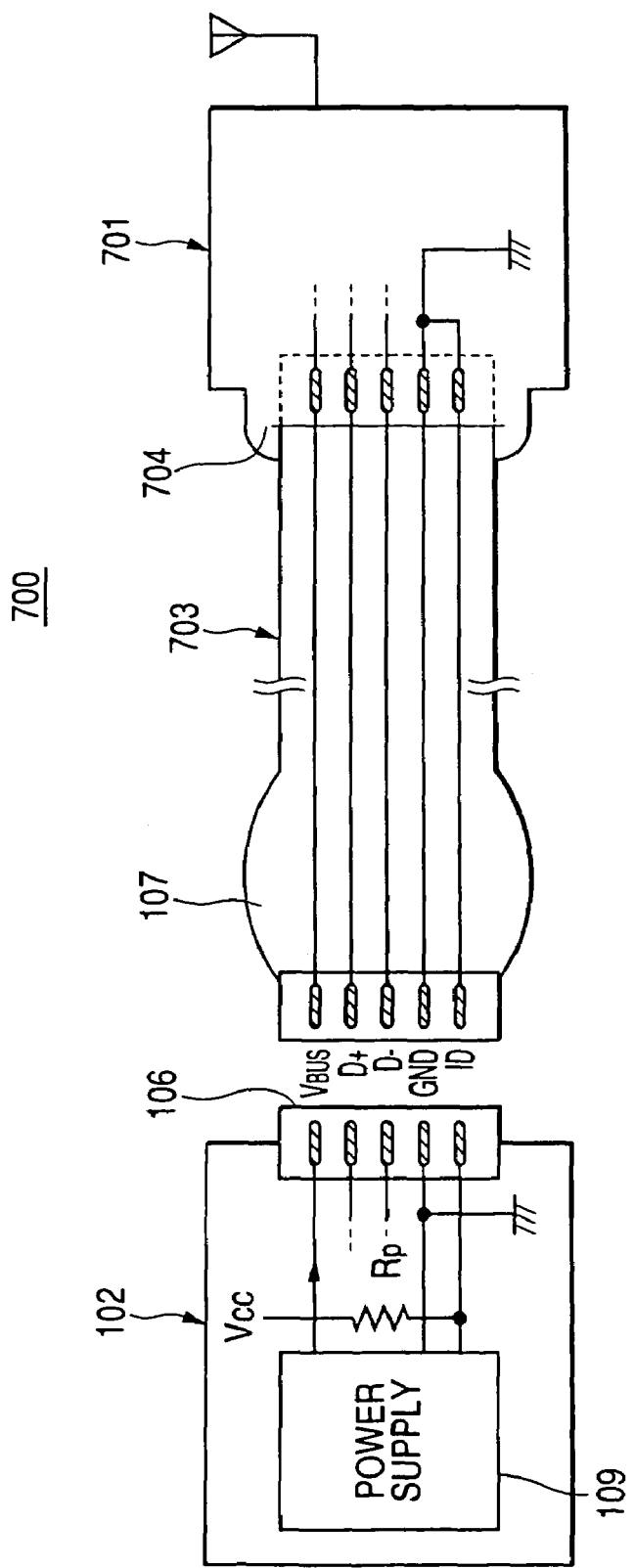
FIG. 7 is a schematic view showing the structure of the USB interface system according to further another preferred embodiment of the invention.

FIG. 7 is a schematic view showing the structure of a USB interface system according to further another preferred embodiment of the invention.

As illustrated in FIG. 7, in this system 700, one end portion of the USB cable 703 is directly fixed to the host 701, in a way non-removable from the host 701. Therefore, it is possible to save the trouble of connecting the USB cable 703 to the host 701 and decrease the number of actions when connecting the host and the device, thereby simplifying the connection work.

Figure 8:
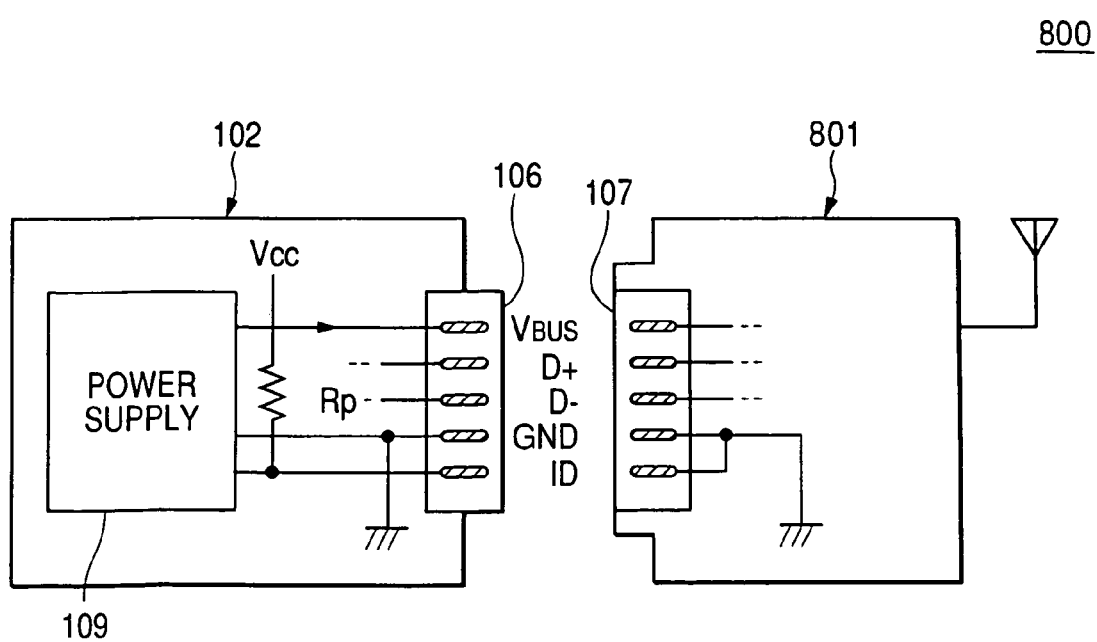
FIG. 8 is a schematic view showing the structure of the USB interface system according to further another embodiment of the invention.

FIG. 8 is a schematic view showing the structure of a USB interface system according to further another embodiment of the invention.

As illustrated in FIG. 8, in this system 800, a host 801 is provided with the Mini-B plug 107 in compliance with the use of the Mini-B receptacle 106 in the device 102. The ID terminal of the Mini-B plug 107 of the host 801 is short-circuited to the GND line. The host 801 is directly connected to the device 102 without interposing the USB cable therebetween. According to this structure, since a host can be directly connected to a device without using a cable, a connection between the host and the device can be established easily.

The invention is not restricted to the above-mentioned embodiments, but various modifications can be added within the scope of the invention described in the claims, and it is needless to say that these modifications are included in the scope of the invention.

For example, although in the above embodiments, the host has the Mini-A receptacle and the USB cable has the Mini-A plug, the physical shapes of connectors don't have to be compliant with the USB. Namely, the host and the USB cable may have the respective receptacle and plug originally formed in a way capable of connecting with each other and thus, hence to connect each line of the USB to each line of the host. Even when adopting this original connector between the host and the USB cable, it is needless to say that the ID line has to be short-circuited to the GND line within the host or within the USB cable.

Further, in the above embodiments, although the case of physically connecting a host and a device, which are accommodated in the separate cases physically independent, via the USB cable, has been described, the invention is not restricted to this, but it may be designed in that the host and the device are connected by a bus initially and that connection/disconnection is controlled electrically by a switch and the like.

In the above embodiments, although the case where the host is a "wireless LAN adapter" and the device is a "digital camera" has been described, it is not restricted to this, but as mentioned above, the invention can be used for various kinds of devices having USB interfaces including printer, FAX, scanner, and handy storage such as USB flash memory and hard disk drive, in addition to the portable devices such as portable phone and PDA.

The invention is effective particularly in the case of connecting a device that wants to receive power and communicate as a host to another device, but the invention can be applied also to the case where a computer device of feeding power as a usual USB host, for example, a personal computer becomes a USB host and a peripheral such as a printer and a digital camera becomes a USB device. Namely, when it is necessary to feed power from the peripheral such as a printer and a digital camera to the personal computer, the invention may be used.

The above-mentioned wireless LAN adapter is not restricted to the standard wireless LAN compliant with the IEEE802.11b and the like, but the Bluetooth or the HomeRF may be used. Namely, any means will do as far as it is capable of wirelessly connecting to a local area network, and the size of the network is not restricted particularly.

As set forth hereinabove, the invention can provide a USB interface system capable of supplying power from a device to a host without forming a peripheral as a dual role device.

What is claimed is:

1. A USB interface system comprising:
a host configured to control data transmission and a device connected through a USB interface, said device including:
a Mini-B receptacle,
voltage supply which applies a predetermined voltage to an ID terminal of the Mini-B receptacle so as to pull-up the ID terminal, and
power supply which feeds power to a $V_{bus}$ terminal of the Mini-B receptacle when the voltage of the ID terminal is reduced to a second predetermined level,
wherein when said device is connected to the host, the ID terminal is shorted to a GND line and the power supply feeds the power to the $V_{bus}$ terminal of the Mini-B receptacle, so as to supply the power to the host, and
wherein the host is not a dual role device.

2. The USB interface system according to claim 1, wherein the host includes a Mini-A receptacle and an ID terminal of the Mini-A receptacle is connected to a GND line.

3. The USB interface system according to claim 1, further comprising a USB cable connecting the host and the device, in which an ID line of the USB cable is connected to a GND line.

4. The USB interface system according to claim 2, further comprising a USB cable connecting the host and the device, one end of the USB cable is directly fixed to the host.

5. The USB interface system according to claim 1, wherein the host includes a Mini-B plug and an ID terminal of the Mini-B plug is connected to a GND line.

6. The USB interface system according to claim 1, wherein the host is a wireless LAN adapter.

7. A device to be connected to a host configured to control data transmission via a USB interface, comprising:
a Mini-B receptacle;
voltage supply which applies a predetermined voltage to an ID terminal of the Mini-B receptacle so as to pull-up the ID terminal; and
power supply which feeds power to a $V_{bus}$ terminal of the Mini-B receptacle when the voltage of the ID terminal is reduced to a second predetermined level,
wherein when said device is connected to the host, the ID terminal is shorted to a GND line and the power supply feeds the power to the $V_{bus}$ terminal of the Mini-B receptacle, so as to supply the power to the host, and
wherein the host is not a dual role device.

8. The device according to claim 7, wherein the device does not require a Session Request Protocol or a Host Negotiation Protocol in order for the power supply to supply power to the $V_{bus}$.

9. A device to be connected to a host via a USB interface, comprising:
  a Mini-B receptacle;
  power feeding means for applying a predetermined voltage to an ID terminal of the Mini-B receptacle and for feeding power to a $V_{bus}$ terminal of the Mini-B receptacle when the voltage of the ID terminal is reduced to a predetermined level, and
  wherein the host is not a dual role device.

10. The device according to claim 9, wherein the device does not require a Session Request Protocol or a Host Negotiation Protocol in order for the power feeding means to supply power to the $V_{bus}$.

* * * * *